US012812520B2

(12) United States Patent
Raghavachari et al.

(10) Patent No.: US 12,812,520 B2
(45) Date of Patent: Nov. 24, 2026

(54) METHOD AND SYSTEM FOR TERRESTRIAL AND NON-TERRESTRIAL NETWORKS SELECTION

(71) Applicant: Verizon Patent and Licensing Inc., Basking Ridge, NJ (US)

(72) Inventors: Balaji L. Raghavachari, Bridgewater, NJ (US); Lily Zhu, Parsippany, NJ (US); Andrew E. Youtz, Princeton, NJ (US)

(73) Assignee: Verizon Patent and Licesning Inc., Basking Ridge, NJ (US)

( * ) Notice: Subject to any disclaimer, the term of this patent is extended or adjusted under 35 U.S.C. 154(b) by 780 days.

(21) Appl. No.: 18/162,906

(22) Filed: Feb. 1, 2023

(65) Prior Publication Data

US 2024/0259930 A1 Aug. 1, 2024

(51) Int. Cl.

*H04W 48/18* (2009.01)
*H04W 48/16* (2009.01)
*H04W 84/06* (2009.01)

(52) U.S. Cl.

CPC ........... *H04W 48/18* (2013.01); *H04W 48/16* (2013.01); *H04W 84/06* (2013.01)

(58) Field of Classification Search

CPC ...... H04W 48/18; H04W 48/16; H04W 84/06
See application file for complete search history.

(56) References Cited

U.S. PATENT DOCUMENTS

| | | | | |
|---|---|---|---|---|
| 6,901,276 | B1 * | 5/2005 | Skinner | H04W 48/16 455/574 |
| 12,058,582 | B2 * | 8/2024 | Chen | H04W 36/30 |
| 2010/0054205 | A1 * | 3/2010 | Kalhan | H04W 48/14 370/331 |
| 2015/0247928 | A1 | 9/2015 | Waters | |
| 2019/0007894 | A1 * | 1/2019 | Subramanian | H04W 64/00 |
| 2021/0068013 | A1 * | 3/2021 | Cheng | H04W 48/18 |
| 2023/0066232 | A1 | 3/2023 | Caro | |
| 2023/0254803 | A1 | 8/2023 | Lu | |
| 2024/0236820 | A1 * | 7/2024 | Sugiyama | H04W 48/16 |
| 2025/0024282 | A1 * | 1/2025 | Kim | H04W 48/08 |
| 2025/0063532 | A1 | 2/2025 | Ko | |

* cited by examiner

*Primary Examiner* — Steven S Kelley

(57) ABSTRACT

A method, a device, and a non-transitory computer-readable storage medium are described in relation to an terrestrial and non-terrestrial networks selection service. The terrestrial and non-terrestrial networks selection service may intelligently manage the searching, accessing, and connecting to terrestrial and non-terrestrial networks. The terrestrial and non-terrestrial networks selection service may enable configurable searching, accessing, and connection procedures among terrestrial and non-terrestrial networks. The configurations may include scanning intervals and attempts that may improve resource utilization and battery usage of a device, such as an end device.

20 Claims, 4 Drawing Sheets

METHOD AND SYSTEM FOR TERRESTRIAL AND NON-TERRESTRIAL NETWORKS SELECTION

BACKGROUND

Development and design of networks present certain challenges from a network-side perspective and an end device perspective. For example, Next Generation (NG) wireless networks, such as Fifth Generation New Radio (5G NR) networks are being deployed and are under development. The establishment and maintenance of wireless connectivity between the end device and a wireless network remains an ongoing issue.

DETAILED DESCRIPTION

Figure 1:
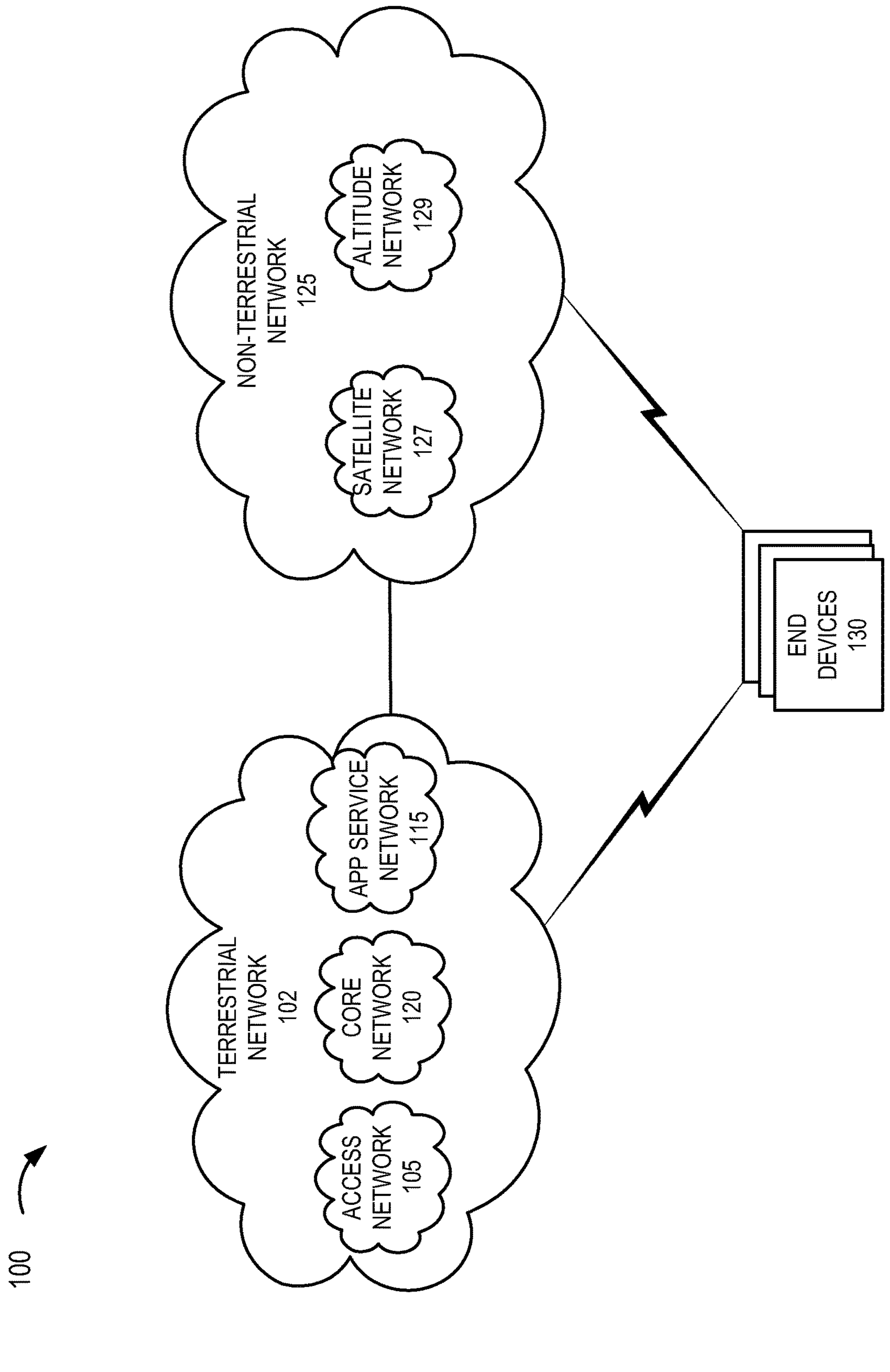
FIG. 1 is a diagram illustrating an exemplary environment in which an exemplary embodiment of a terrestrial and non-terrestrial networks selection service may be implemented.

The following detailed description refers to the accompanying drawings. The same reference numbers in different drawings may identify the same or similar elements. Also, the following detailed description does not limit the invention.

Satellite direct to device communication has become popular in recent years. A satellite network is typically inferior to a cellular network due to its limited performance and available bandwidth, for example. By way of further example, there are performance challenges related to a non-terrestrial network (NTN), such as a satellite network, pertaining to management of distance, speed, and mobility of both the satellite and the end device. Additionally, for example, reliability, stability, propagation delay, throughput, bandwidth, and other metrics may impact end device connectivity and quality of service for application service sessions. However, the satellite network may supplement wireless service when a terrestrial network (TN), such as the cellular network is not available. Depending on the scenario, the coverage areas associated with the satellite network and the cellular network may or may not overlap.

Aside from performance-related trade-offs that may pertain to end device connectivity with a TN versus an NTN, there also may be trade-offs involved in the performance of an NTN search versus a TN search and/or establishing access and connectivity with the NTN versus with the TN. For example, the performance of the NTN search by the end device may be more resource utilization intensive (e.g., processor, etc., of the end device) and/or may be more taxing on battery usage or power utilization relative to the TN search. Additionally, or alternatively, an NTN access and establishment of a connection with the NTN (e.g., an uplink connection, a downlink connection, synchronization, etc.)

may be more resource utilization intensive and/or may be more taxing on battery usage or power utilization relative to a TN-based access and connectivity procedure. For example, depending on the type of NTN and/or sub-type of NTN (e.g., satellite versus non-satellite, stationary versus moving, etc.), the radio frequency (RF) bands to search and scan (e.g., a mobile satellite service (MSS) band, a cellular band, etc.), availability of a satellite link, and/or other variables (e.g., a proprietary NTN versus a standard compliant NTN), such procedures or operations mentioned above may impact the end device differently. Accordingly, there is a need to enable intelligent selection and use of cellular and satellite networks by the end device.

According to exemplary embodiments, a terrestrial and non-terrestrial selection service is described. According to an exemplary embodiment, the terrestrial network may be implemented to include a wireless network, such as a cellular network, a mobile network, a radio access network (RAN), or a non-cellular network, for example. According to an exemplary embodiment, the non-terrestrial network may be implemented as a satellite network or a type of air-based network (e.g., a high altitude platform system (HAPS), air-to-ground, etc.), for example. The non-terrestrial network may be of a proprietary and/or standard compliant (e.g., Third Generation Partnership Project (3GPP), 3GPP2, International Telecommunication Union (ITU), European Telecommunications Standards Institute (ETSI), GSM Association (GSMA), and the like) nature. According to an exemplary embodiment, an end device includes the terrestrial and non-terrestrial selection service, as described herein.

According to an exemplary embodiment, the terrestrial and non-terrestrial selection service may include configurable criteria that may cause or trigger the end device to search or scan for a non-terrestrial network. According to various exemplary embodiments, the criteria may relate to an automatic operation or a non-automatic operation (e.g., involve manual intervention by a user of the end device). For example, the criteria may include when terrestrial network service is not available. For example, the end device may unsuccessfully search and scan for cellular service. According to another example, the criteria may include when the end device may be barred from terrestrial network connectivity. According to yet another example, the criteria may include when attempts for terrestrial network connectivity result in repeated failures. According to still another example, the criteria may include that the user may trigger a search or scan for a non-terrestrial network when any of the above-mentioned situations exists.

According to an exemplary embodiment, the terrestrial and non-terrestrial selection service may include configurable criteria that may cause or trigger the end device to search or scan for a terrestrial network after the end device has established a non-terrestrial connection with a non-terrestrial network. According to an exemplary embodiment, the criteria may include frequencies, scanning or searching interval, and a total number of searches or scans, as described herein. The criteria may include a retry and/or a backoff parameter, as described herein. According to an exemplary embodiment, the criteria may be configured to optimize various factors such as mobility, access to a network of a higher priority, battery consumption of the end device, end device resource utilization, and/or performance related metrics (e.g., throughput, reliability, etc.), for example.

In view of the foregoing, the terrestrial and non-terrestrial selection service may manage the selection and use of terrestrial and non-terrestrial networks by an end device and support continuous end device connectivity with a network in an optimal manner. The terrestrial and non-terrestrial selection service may improve the access and use of application services by the end device, as described herein.

FIG. 1 is a diagram illustrating an exemplary environment 100 in which an exemplary embodiment of a terrestrial and non-terrestrial networks selection service may be implemented. As illustrated, environment 100 includes a terrestrial network 102 and a non-terrestrial network 125. Terrestrial network 102 may include an access network 105, an application ("app") service network 115, and a core network 120. Non-terrestrial network 125 may include a satellite network 127 and an altitude-based network 129. Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, non-terrestrial network 125 may not include altitude-based network 129. Additionally, or alternatively, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or network access to an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). Network devices may include non-virtual, logical, and/or physical network devices.

Environment 100 includes communication links between the networks and between the networks and end devices 130. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the terrestrial and non-terrestrial networks selection service may use at least one of these planes of communication. According to various exemplary implementations, the interface of the network device and/or end device 130 may be a service-based interface, a reference point-based interface, an Open Radio Access Network (O-RAN) interface, a 5G interface, another generation of interface (e.g., 5.5G, Sixth Generation (6G), Seventh Generation (7G), etc.), a satellite interface, or some other type of communication interface.

Terrestrial network 102 may include one or multiple networks of one or multiple types and/or technologies that may be ground-based. Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices (not illustrated). For example, the access devices may be implemented to include a next generation Node B (gNB), an evolved Long Term Evolution (eLTE) evolved Node B (eNB), an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE) that provides a wireless access service, or the like).

Application service network 115 may include one or multiple networks of one or multiple types and technologies that provides an application service. For example, application service network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. Application service network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, application service network 115 may include various network devices such as external devices. For example, the external devices may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, application service network 115 may include one or multiple types of core devices, as described herein.

The external devices may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. The external devices may also include other types of network devices that support the operation of application service network 115 and the provisioning of application services, such as an orchestrator, an edge manager, an operations support system (OSS), a local domain name system (DNS), registries, and/or external devices that may pertain to various network-related functions (e.g., security, management, charging, billing, authentication, authorization, policy enforcement, development, etc.).

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices, such as core devices. For example, the core devices may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

The core devices may include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, the core devices may include a split core device. For example, the core device may include a session management (SM) PCF, an access management (AM) PCF, a user equipment (UE) PCF, and/or another type of split architecture associated with another core device, as described herein.

Access network 105, application service network 115, and/or core network 120 may include other types of network devices, such as transport devices. The transport devices may include a router, a switch, a relay, and the like.

Non-terrestrial network 125 may include one or multiple networks of one or multiple types and/or technologies that may be aerial, space, and/or altitude based. Satellite network 127 may include one or multiple types of satellite networks of one or multiple technologies. For example, satellite network 127 may include a low earth orbit (LEO) satellite network, a medium earth orbit (MEO), a geostationary or geosynchronous orbit (GEO) satellite network, or another type of satellite network (e.g., future generation, non-LEO, non-MEO, non-GEO, etc.). Satellite network 127 may include a satellite, such as a LEO satellite, a MEO satellite, a GEO satellite, or another type of satellite. Satellite network 127 and the satellites may provide a cellular device-satellite communications service. Satellite network 127 may include a ground station. The ground station may include a station (also known as an earth station, for example) that is configured to communicate with the satellite of satellite network 127. For example, the ground station may transmit data to the satellite, receive data from the satellite, or both. The ground station may provide cellular device-satellite communications service. According to some exemplary embodiments, the access device (e.g., of access network 105) may be integrated with the ground station. According to some exemplary embodiments, the ground station may be configured to communicate directly or indirectly (e.g., via the access device) to end device 130. According to such exemplary embodiments, the ground station may include antennas and communication logic for communication to and from the satellites and other antennas and other communication logic for communication to and from end device 130. The ground station may be co-located with the access device.

Altitude-based network 129 may include one or multiple types of networks of one or multiple technologies that may be non-satellite based. For example, altitude-based network 129 may include a HAPS network, an air-to-ground network, an unmanned aerial device-based network, and/or the like.

End device 130 includes a device that has wireless communication capabilities. End device 130 may have non-wireless communication capabilities (e.g., wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or another type of user equipment (UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 includes logic that provides an exemplary embodiment of the terrestrial and non-terrestrial networks selection service, as described herein. For example, end device 130 may include logic that manages the invocation and execution of non-terrestrial network searches and connection/disconnection with non-terrestrial networks, as described herein. End device 130 may include logic that logic that manages the invocation and execution of terrestrial network searches, as described herein. According to an exemplary embodiment, the terrestrial and non-terrestrial networks selection service may provide a preference to searching, accessing, and connecting with a terrestrial network relative to a non-terrestrial network, as described herein. According to another exemplary embodiment, this may not be the case.

Figure 2:
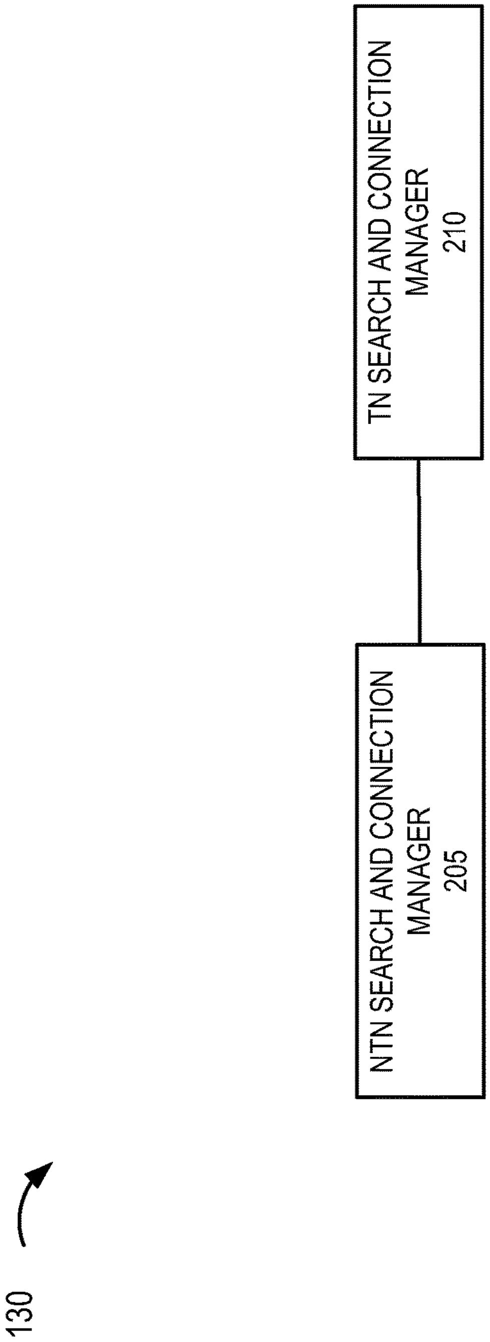
FIG. 2 is a diagram illustrating exemplary components of an exemplary embodiment of the terrestrial and non-terrestrial networks selection service implemented by an end device.

FIG. 2 is a diagram illustrating exemplary components of an exemplary embodiment of the terrestrial and non-terrestrial networks selection service that may be included in end device 130. As illustrated, end device 130 may include an NTN search and connection manager 205 and a TN search and connection manager 210. According to other exemplary embodiments, end device 130 may include additional, different, and/or fewer components than those illustrated and described to provide an exemplary embodiment of the terrestrial and non-terrestrial networks selection service. According to other exemplary embodiments, multiple components may be combined into a single component. Additionally, or alternatively, a single component may be implemented as multiple components in which a process or a function may be collaboratively performed or multiple processes or functions may be split between them.

According to some exemplary embodiments, the logic of NTN search and connection manager 205 and the logic of TN search and connection manager 210 may be implemented as a part of a modem and/or communication interface of end device 130.

NTN search and connection manager 205 may include logic that manages NTN searches and connection to and disconnection from an NTN. According to an exemplary embodiment, NTN search and connection manager 205 may be configured with criteria that indicates when an NTN search should be invoked. According to an exemplary embodiment, NTN search and connection manager 205 may monitor and detect when a criterion is satisfied that may cause end device 130 to perform an NTN search. According to an exemplary embodiment, the criteria may relate to an automatic operation or a non-automatic operation (e.g., involve manual intervention by a user of the end device). For example, the criteria may include when terrestrial network service is not available. By way of further example, end device 130 may unsuccessfully perform a search and/or a scan (e.g., no RF band, cell, channel, and/or the like is discovered from a search and/or scan result) for one or more RF bands, cells, and the like associated with a terrestrial network. Alternatively, end device 130 may identify one or multiple RF bands, etc., from a search result, but the discovered and measured RF band, etc., does not satisfy a threshold value and/or other criteria pertaining to a cell selection or cell reselection procedure, as described herein. As an example, end device 130 may compare a measured value to a threshold value pertaining to a Reference Signal Receive Power (RSRP) value, a Received Signal Strength Indicator (RSSI) value, a Reference Signal Received Quality (RSRQ) value, a signal-to-noise ratio (SNR) value, a signal-to-interference-plus-noise ratio (SINR) value, and/or other types of threshold/criteria values (e.g., Squal, Srxlev, Qrxlexmeas, Qqualmeas, and the like), which may or may not be associated with a wireless standard (e.g., 3GPP, etc.) and may be calculated by end device 130.

According to another example, the criteria may include when end device 130 may be barred from terrestrial network connectivity. According to yet another example, the criteria may include when attempts for terrestrial network connectivity result in repeated failures. For example, the condition of repeated failures may be identified based on a time period (e.g., associated with a timer), a number of repeated and failed attempts to identify a candidate TN and/or establish a connection with a (candidate) TN. According to still another example, the criteria may include that the user may trigger a search or scan for a non-terrestrial network when any of the above-mentioned situations exists.

According to an exemplary embodiment, NTN search and connection manager 205 may be configured with search and scanning parameters that enable end device 130 to identify available candidate NTNs that end device 130 may connect. According to an exemplary embodiment, end device 130 may search and scan an RF band and/or the like, as described herein. For example, the RF band may be associated with an MSS, a non-cellular RF band, a cellular RF band, or another kind of satellite RF band. According to an exemplary embodiment, end device 130 may measure a reference and/or a common signal of the RF band. According to an exemplary embodiment, NTN search and connection manager 205 may perform a search and scan procedure based on whether the NTN search is directed to a standard compliant NTN (e.g., 3GPP compliant, etc.) versus a proprietary NTN. For the search and scan procedures may be different and involve different steps and/or operations.

According to an exemplary embodiment, the search and scanning parameters may specify the RF band to search and a scanning interval for the radio frequency/band. For example, end device 130 may search an RF band "X" for a period of "Y" seconds. The search and scanning parameters may include other parameters pertaining to the NTN search. For example, the search and scanning parameters may specify the number of attempts for searching or scanning the RF band. For example, end device 130 may search the RF band "X" a total of "Z" times. The search and scanning parameters may include a parameter that specifies a back-off period when a search of the RF band is unsuccessful. According to other exemplary embodiments, the search and scanning parameters may not specify the RF band. For example, end device 130 may perform a "blind" search of radio spectrum.

According to an exemplary embodiment, the search and scanning parameters may specify searching into groups in which the scanning interval may be the same. For example, a first scanning group may have a scanning interval of $T_1$ and a second scanning group may have a scanning interval of $T_2$ in which $T_2 > T_1$. According to another exemplary embodiment, the search and scanning parameters may specify searching into groups in which the scanning interval may differ within a scanning group. For example, the first scanning group may have scanning intervals of $T_N > \ldots > T_3 > T_2 > T_1$ or $T_N < \ldots < T_3 < T_2 < T_1$. According to still other exemplary embodiments, the scanning interval may dynamically change (e.g., within a scanning group, between scanning groups, etc.) depending on the number of the attempt. For example, the scanning interval may change between a first search attempt and a second search attempt.

According to yet other exemplary embodiments, the search and scanning parameters may specify one or multiple RF bands that may be associated with a scanning group. As such, the scanning interval within a scanning group and correlated to an RF band of a scanning group, may differ within a scanning group, between scanning groups, or both.

According to an exemplary embodiment, the search and scanning parameters may include other parameters that manage the searching and scanning of non-terrestrial network frequencies/bands. For example, the search and scanning parameters may specify RF bands, scan intervals, and/or attempts based on location of end device 130, historical NTN search information (e.g., successful, not successful, RF band, type of NTN, sub-type of satellite, etc.), current day and time, and/or other context information.

According to an exemplary embodiment, NTN search and connection manager 205 may be configured with one or multiple threshold values to which may be used to compare a measured signal stemming from the search and/or scan. For example, NTN search and connection manager 205 may compare the measured signal to a threshold value (e.g., RSRP value, RSRQ value, Squal value, etc.), as described herein. Additionally, or alternatively, NTN search and connection manager 205 may compare the measured signal to another type of value, which may be associated with a proprietary NTN.

According to an exemplary embodiment, based on the result of the scanning and searching for candidate NTNs and measurement and evaluation procedure, NTN search and connection manager 205 may determine whether to establish a connection with an NTN. NTN search and connection manager 205 may consider various parameters, such as a priority of a candidate NTN relative to another candidate NTN, the type of NTN (e.g., a satellite network versus a HAPS), a sub-type of a satellite network (e.g., a GEO satellite network versus a LEO satellite network), results of comparisons to threshold values, and/or other context information (e.g., current and/or prospective application service sessions and associated performance metric(s) that support such session(s), etc.). As an example, resource utilization and/or battery usage may differ between different sub-types of the satellite network, types of NTNs (e.g., satellite versus HAPS), and/or proprietary versus standard compliant NTNs. By way of further example, selection of a stationary satellite device or constellation (e.g., GEO satellite device or constellation) may reduce resource and/or battery usage of end device 130 because timing and/or frequency offsets may not need to be calculated relative to a moving satellite device or constellation (e.g., LEO satellite device or constellation). Alternatively, for example, the measurement and evaluation procedure and/or the access and connection procedure may be different between a proprietary NTN versus a standard compliant NTN in which the procedure associated with the proprietary NTN may yield a higher resource utilization and/or battery usage.

NTN search and connection manager 205 may manage the connection to and the disconnection from a selected NTN. For example, NTN search and connection manager 205 may manage a synchronization procedure and may establish an uplink connection and/or downlink connection with the NTN. NTN search and connection manager 205 may be configured to perform such procedures for both standard compliant and proprietary NTNs, as described herein.

TN search and connection manager 210 may include logic that manages TN searches and connection to and disconnection from a TN. According to various exemplary embodiments, TN search and connection manager 210 may include logic that performs searching/scanning procedures, measurement and evaluation procedures, and/or access and connection procedures according to a standard (e.g., 3GPP, 3GPP2, etc.) and/or of a proprietary nature. According to an exemplary embodiment, TN search and connection manager 210 may be configured with criteria that indicates when a TN search should be invoked. According to an exemplary embodiment, TN search and connection manager 210 may monitor and detect when a criterion is satisfied that may cause end device 130 to perform a TN search. According to an exemplary embodiment, the criteria may relate to an automatic operation or a non-automatic operation (e.g., involve manual intervention by a user of the end device). For example, the criteria may include when end device 130 has no terrestrial network connectivity. According to another example, the criteria may include when end device 130 has lost non-terrestrial network connectivity. According to yet another example, the criteria may include when attempts for non-terrestrial network connectivity result in repeated failures. For example, the condition of repeated failures may be identified based on a time period (e.g., associated with a timer), a number of repeated and failed attempts to identify a candidate NTN and/or establish a connection with a (candidate) NTN. According to still another example, the criteria may include that the user may trigger a search or scan for a terrestrial network when any of the above-mentioned situations exists. According to still other examples, end device 130 may perform establish a radio resource control (RRC) connection with an access device, perform a cell selection or reselection procedure, and the like according to a standard (e.g., 3GPP, 3GPP2, etc.) and/or according to a proprietary method, as a part of a boot-up process of end device 130, periodically when no terrestrial connection exists, and so forth.

According to an exemplary embodiment, TN search and connection manager 210 may be configured with search and scanning parameters that enable end device 130 to identify available candidate TNs that end device 130 may connect. According to an exemplary embodiment, end device 130 may search and scan an RF band, channel, cell, and/or the like. For example, the RF band may be associated with a non-cellular RF band, a cellular RF band or another kind of terrestrial network RF band. According to an exemplary embodiment, end device 130 may measure a reference signal of the RF band. According to an exemplary embodiment, TN search and connection manager 210 may be configured with one or multiple threshold values (e.g., RSRP, RSRQ, Squal, etc., as described herein) to which may be used to compare the measured reference signal.

According to an exemplary embodiment, the search and scanning parameters may specify the RF band to search and a scanning interval for the RF band. For example, end device 130 may search an RF band "T" for a period of "V" seconds. The search and scanning parameters may include other parameters pertaining to the TN search. According to an exemplary embodiment, the search and scanning parameter may specify the number of attempts for searching or scanning the RF band. For example, end device 130 may search the RF band "T" a total of "W" times. The search and scanning parameters may include a parameter that specifies a back-off period when a search of the RF band is unsuccessful.

According to an exemplary embodiment, the search and scanning parameters may specify RF bands into scanning groups in which the scanning interval within a scanning group may differ or be the same, as described in relation to NTN search and connection manager 205. According to an exemplary embodiment, the search and scanning parameters may include other parameters that manage the searching and scanning of terrestrial network RF bands, cells, etc. For example, the search and scanning parameters may specify RF bands, scanning intervals, and/or attempts based on location of end device 130, historical TN search information, current day and time, and/or other context information.

According to an exemplary embodiment, based on the result of the scanning and searching for candidate TNs and measurement and evaluation procedure, TN search and connection manager 210 may determine whether to establish a connection with a TN. TN search and connection manager 210 may consider various parameters, such as a priority of a candidate TN relative to another candidate TN, the type of TN (e.g., a fixed network, a mobile network, the RAT (e.g., 4G versus 5G), etc.), results of comparisons to threshold values, and/or other context information. TN search and connection manager 210 may manage the connection to and the disconnection from a selected TN.

Figure 3:
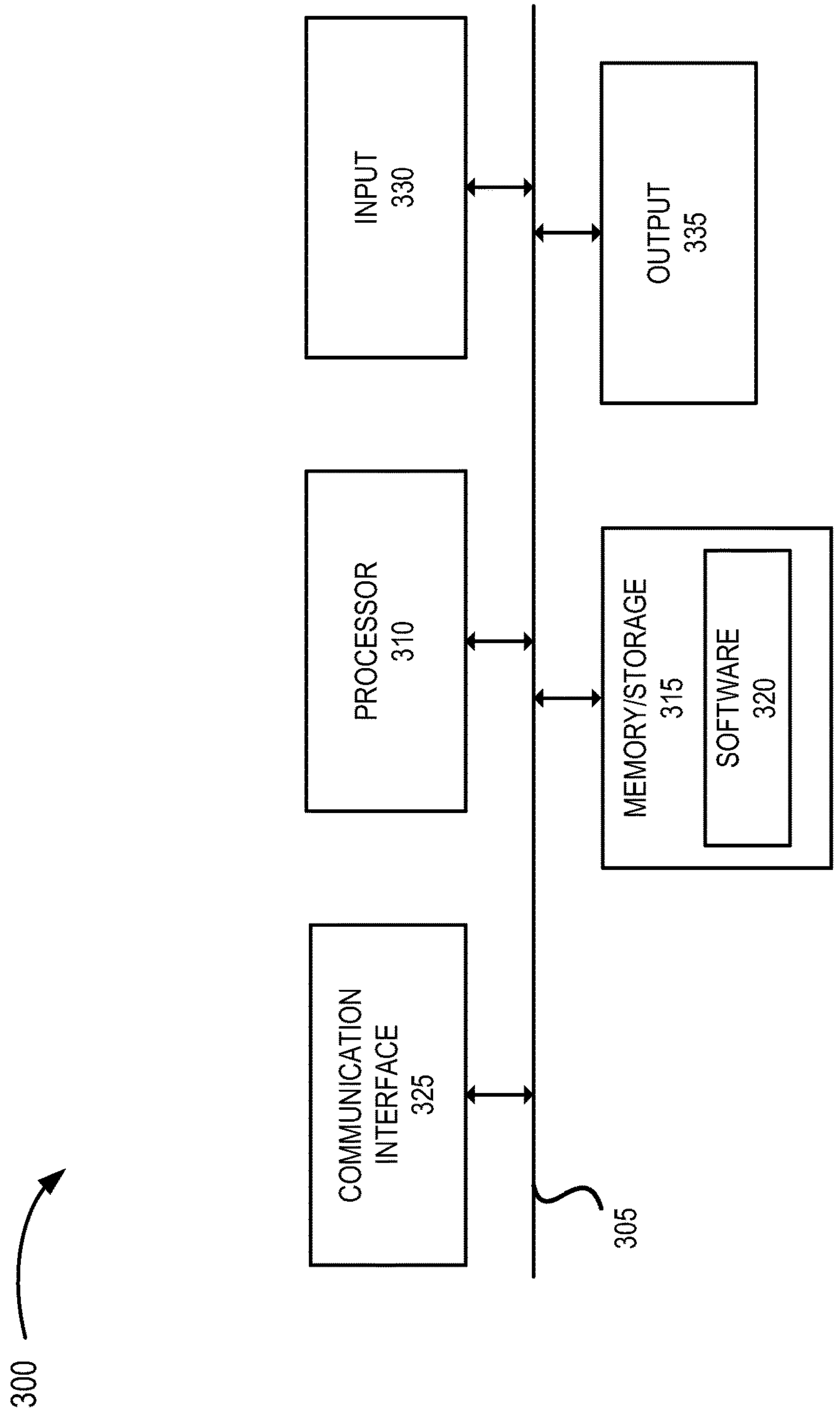
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to end device 130, a network device (e.g., access device, external device, core device, etc.) and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to end device 130, software 320 may include an application that, when executed by processor 310, provides a function and/or a process of terrestrial and non-terrestrial networks selection service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. Communication interface 325 may include a modem.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, a network device and/or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
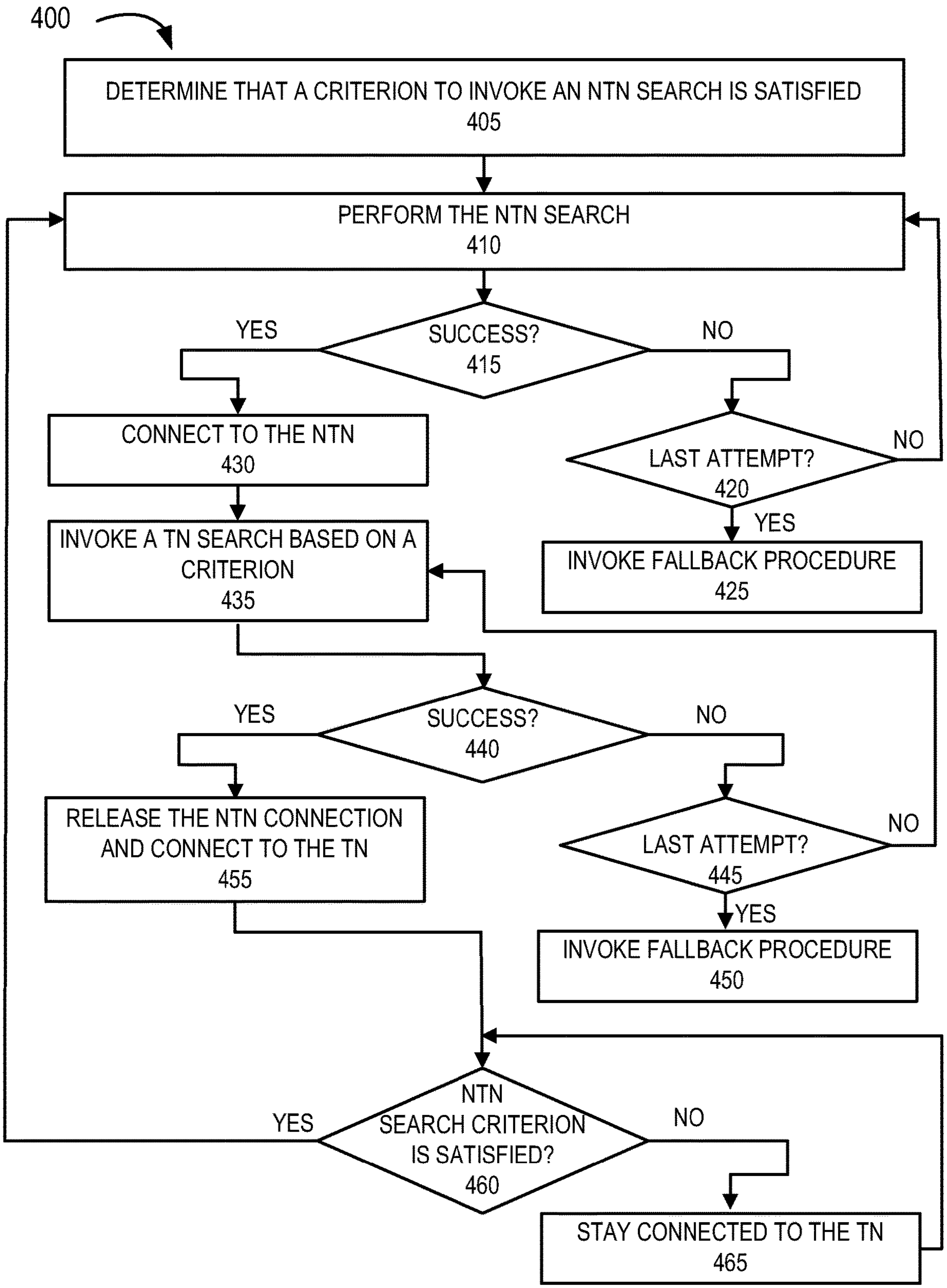
FIG. 4 is a flow diagram illustrating an exemplary process of an exemplary embodiment of the terrestrial and non-terrestrial networks selection service.

FIG. 4 is a flow diagram illustrating an exemplary process 400 of an exemplary embodiment of the terrestrial and non-terrestrial networks selection service. According to an exemplary embodiment, end device 130 may perform process 400. According to an exemplary implementation, processor 310 executes software 320 to perform a step of process 400, as described herein. Alternatively, a step may be performed by execution of only hardware.

In block 405, end device 130 may determine that a criterion to invoke an NTN search is satisfied For example, the criterion may include when terrestrial network service is not available (e.g., no scan results, etc.), when the end device may be barred from terrestrial network connectivity, when attempts for terrestrial network connectivity result in repeated failures (e.g., repeated failures may be defined), or the user may trigger a search or scan for a non-terrestrial network when any of the above-mentioned situations exists. End device 130 may make this determination based on a result of a terrestrial network search, a result of an attempt to connect to a terrestrial network, or a result of performing another type of procedure that would enable end device 130 to determine that the criterion to invoke the NTN search is satisfied.

In block 410, end device 130 may perform an NTN search. For example, end device 130 may perform a scan relative to scanning groups and associated scanning intervals and number of attempts, as described herein. The NTN search may include other parameters relating to how the NTN search is performed, such as a location parameter, a current time parameter, historical NTN scanning or searching information, and/or other configurable parameters, as described herein.

In block 415, end device 130 may determine whether the NTN search is successful. When end device 130 determines that the NTN search is not successful (block 415—NO), end device 130 may determine whether the scan is the last permissible scan according to the scanning parameters (block 420). When end device 130 determines that the scan is not the last permissible scan (block 420—NO), end device 130 may continue to perform the NTN search and return to block 410. When end device 130 determines that the scan is the last permissible scan (block 420—YES), end device 130 may perform a fallback procedure (block 425). For example, end device 130 may perform a TN search. Alternatively, end device 130 may wait a back-off time period before initiating the TN search.

When end device 130 may determine that the NTN search is successful (block 415—YES), end device 130 may establish a connection with the NTN (block 430). End device 130 may invoke a TN search based on a criterion (block 435). For example, in response to the establishment of the connection, end device 130 may perform a scan relative one or multiple scanning groups and associated scanning intervals and number of attempts, as described herein. Alternatively, end device 130 may perform the TN search based on a timer (e.g., periodically), in response to a manual invocation (e.g., by a user), or another triggering event. The TN search may include other parameters relating to how the TN search is performed, such as a location parameter, a current time parameter, historical TN scanning or searching information, TN priority information, and/or other configurable parameters, as described herein.

In block 440, end device 130 may determine whether the TN search is successful. When end device 130 determines that the TN search is not successful (block 440—NO), end device 130 may determine whether the scan is the last permissible scan according to the scanning parameters (block 445). When end device 130 determines that the scan is not the last permissible scan (block 445—NO), end device 130 may continue to perform the TN search and return to block 435. When end device 130 determines that the scan is the last permissible scan (block 445—YES), end device 130 may perform a fallback procedure (block 450). For example, end device 130 may wait a back-off period before conducting another TN search or an NTN search. Alternatively, end device 130 may not wait the back-off period and perform another search.

When end device 130 may determine that the TN search is successful (block 440—YES), end device 130 may release the NTN connection and establish a connection with the TN (block 455). For example, end device 130 may release the NTN connection in response to the establishment of a TN connection. In block 460, end device 130 may monitor or detect when the NTN criterion to invoke an NTN search is satisfied. When the NTN search criterion is satisfied (block 460—YES), end device 130 may perform the NTN search (block 410). When the NTN search criterion is not satisfied (block 460—NO), end device 130 may remain connected to the TN (block 465) and end device 130 may continue to monitor or detect when the NTN criterion to invoke the NTN search is satisfied (block 460).

FIG. 4 illustrates an exemplary process of the terrestrial and non-terrestrial networks selection service, however, according to other exemplary embodiments, the terrestrial and non-terrestrial networks selection service may perform additional operations, fewer operations, and/or different operations than those illustrated and described.

As set forth in this description and illustrated by the drawings, reference is made to “an exemplary embodiment,” “exemplary embodiments,” “an embodiment,” “embodiments,” etc., which may include a particular feature, structure, or characteristic in connection with an embodiment(s). However, the use of the phrase or term “an embodiment,” “embodiments,” etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

determining, by an end device, that a first criterion to invoke a first search of a non-terrestrial network is satisfied;

determining, by the end device, whether an architecture type of the non-terrestrial network is standard compliant or not;

performing, by the end device based on determining whether the architecture type of the non-terrestrial network is standard compliant or not, the first search;

selecting, by the end device based on the first search using a threshold corresponding to the determined architecture type, to establish a connection with the non-terrestrial network based on resource utilization criteria of the end device that pertains to the architecture type of the non-terrestrial network;

establishing, by the end device based on the selecting, the connection to the non-terrestrial network;

performing, by the end device after the establishing, a second search for a terrestrial network;

connecting, by the end device, to the terrestrial network; and releasing, by the end device, the connection to the non-terrestrial network.

2. The method of claim 1, wherein the resource utilization criteria include a processor utilization and a battery utilization.

3. The method of claim 1, wherein the first criterion is satisfied based on a failure to connect to one or more candidate terrestrial networks.

4. The method of claim 1, wherein the first search is performed according to a first search configuration that indicates a first set of one or more radio frequency bands associated with a first scanning interval and a first number of attempts, and a second set of one or more other radio frequency bands associated with a second scanning interval and a second number of attempts.

5. The method of claim 4, wherein the first scanning interval differs from the second scanning interval.

6. The method of claim 4, wherein the first scanning interval includes multiple and different scanning intervals that differ among the radio frequency bands of the first set.

7. The method of claim 1, wherein the determined architecture type includes a stationary satellite device.

8. The method of claim 1, wherein the first search is performed according to a first search configuration that indicates a first set including a first scanning interval and a first number of attempts, and a second set including a second scanning interval and a second number of attempts, wherein the first scanning interval and the second scanning interval are different.

9. An end device comprising:
- a processor that is configured to:
  - determine that a first criterion to invoke a first search of a non-terrestrial network is satisfied;
  - determine whether an architecture type of the non-terrestrial network is standard compliant or not;
  - perform, based on a determination whether the architecture type of the non-terrestrial network is standard compliant or not, the first search;
  - select, based on the first search using a threshold corresponding to the determined architecture type, to establish a connection with the non-terrestrial network based on resource utilization criteria of the end device that pertains to the architecture type of the non-terrestrial network;
  - establish, based on the selection, the connection to the non-terrestrial network;
  - perform, after the establishment of the connection, a second search for a terrestrial network;
  - connect to the terrestrial network; and
  - release the connection to the non-terrestrial network.

10. The end device of claim 9, wherein the resource utilization criteria include a processor utilization and a battery utilization.

11. The end device of claim 9, wherein the first criterion is satisfied based on a failure to connect to one or more candidate terrestrial networks.

12. The end device of claim 11, wherein the first search is performed according to a first search configuration that indicates a first set of one or more radio frequency bands associated with a first scanning interval and a first number of attempts, and a second set of one or more other radio frequency bands associated with a second scanning interval and a second number of attempts.

13. The end device of claim 12, wherein the first scanning interval differs from the second scanning interval.

14. The end device of claim 12, wherein the first scanning interval includes multiple and different scanning intervals that differ among the radio frequency bands of the first set.

15. The end device of claim 9, wherein the determined architecture type includes a stationary satellite device.

16. The end device of claim 9, wherein the first search is performed according to a first search configuration that indicates a first set including a first scanning interval and a first number of attempts, and a second set including a second scanning interval and a second number of attempts, wherein the first scanning interval and the second scanning interval are different.

17. A non-transitory computer-readable storage medium storing instructions executable by a processor of a device, wherein the instructions are configured to:
- determine that a first criterion to invoke a first search of a non-terrestrial network is satisfied;
- determine whether an architecture type of the non-terrestrial network is standard compliant or not;
- perform, based on a determination whether the architecture type of the non-terrestrial network is standard compliant or not, the first search;
- select, based on the first search using a threshold corresponding to the determined architecture type, to establish a connection with the non-terrestrial network based on resource utilization criteria of the end device that pertains to the architecture type of the non-terrestrial network;
- establish, based on the selection, the connection to the non-terrestrial network;
- perform, after the establishment of the connection, a second search for a terrestrial network;
- connect to the terrestrial network; and
- release the connection to the non-terrestrial network.

18. The non-transitory computer-readable storage medium of claim 17, wherein the determined architecture type includes a stationary satellite device.

19. The non-transitory computer-readable storage medium of claim 17, wherein the resource utilization criteria include a processor utilization and a battery utilization.

20. The non-transitory computer-readable storage medium of claim 17, wherein the first search is performed according to a first search configuration that indicates a first set including a first scanning interval and a first number of attempts, and a second set including a second scanning interval and a second number of attempts, wherein the first scanning interval and the second scanning interval are different.

* * * * *